US012599459B2

(12) United States Patent
Kim et al.

(10) Patent No.: US 12,599,459 B2
(45) Date of Patent: Apr. 14, 2026

(54) DEVICE COMPRISING HANDPIECE CONNECTOR HAVING FILTER COUPLED THERETO

(71) Applicant: DOULOSTEC.CO., LTD, Seoul (KR)

(72) Inventors: Man Yong Kim, Seoul (KR); Moung Keun Kim, Gunpo-si (KR)

(73) Assignee: DOULOSTEC.CO.,LTD, Seoul (KR)

( * ) Notice: Subject to any disclaimer, the term of this patent is extended or adjusted under 35 U.S.C. 154(b) by 246 days.

(21) Appl. No.: 18/576,139

(22) PCT Filed: Jun. 8, 2022

(86) PCT No.: PCT/KR2022/008047
§ 371 (c)(1),
(2) Date: Jan. 3, 2024

(87) PCT Pub. No.: WO2023/033320
PCT Pub. Date: Mar. 9, 2023

(65) Prior Publication Data
US 2024/0307148 A1 Sep. 19, 2024

(30) Foreign Application Priority Data
Sep. 3, 2021 (KR) ........................ 10-2021-0117707

(51) Int. Cl.
*A61C 1/14* (2006.01)
*A61C 1/00* (2006.01)
*A61C 1/12* (2006.01)

(52) U.S. Cl.
CPC .............. *A61C 1/12* (2013.01); *A61C 1/0076* (2013.01); *A61C 1/141* (2013.01)

(58) Field of Classification Search
CPC ..................................................... A61C 1/0076
See application file for complete search history.

(56) References Cited

U.S. PATENT DOCUMENTS 3,364,576 A * 1/1968 Kern, Jr. ................ A61C 1/052
433/104
5,211,531 A * 5/1993 Kakimoto ................ A61C 1/05
415/111
5,474,451 A * 12/1995 Dalrymple ................ A61L 2/24
433/80
(Continued)

FOREIGN PATENT DOCUMENTS

FR 2733695 A1 * 11/1996 ............. B01D 61/18
JP 02-017055 A 1/1990
(Continued)

*Primary Examiner* — Heidi M Eide
(74) *Attorney, Agent, or Firm* — Bridgeway IP Law Group, PLLC; Jihun Kim

(57) ABSTRACT

A device including a handpiece connector to which a filter is coupled can be combined with the handpiece and has a connector accommodating therein a filter with an increased cross-sectional area, which can be replaced in a detachable manner, so that it can prevent saliva, blood, bacteria, and foreign substances that may be mixed with the air flowing along inside the handpiece from being exposed to the inside of the patient's oral cavity, causing contamination or infection, and prevent performance degradation and a fault of the handpiece caused by foreign substances accumulating inside the handpiece.

5 Claims, 12 Drawing Sheets

(56)　　　　　　References Cited

U.S. PATENT DOCUMENTS

| | | | | | |
|---|---|---|---|---|---|
| 5,716,210 | A | * | 2/1998 | Novak | A61C 1/0007 |
| | | | | | 433/80 |
| 5,897,317 | A | * | 4/1999 | Hansen | A61C 1/052 |
| | | | | | 433/132 |
| 5,971,757 | A | * | 10/1999 | Selzer | A61L 2/022 |
| | | | | | 433/80 |
| 2002/0127511 | A1 | | 9/2002 | Wade | |
| 2008/0257815 | A1 | * | 10/2008 | McCary | A61C 17/125 |
| | | | | | 210/416.1 |

FOREIGN PATENT DOCUMENTS

| | | | |
|---|---|---|---|
| JP | 06-031708 | U | 4/1994 |
| JP | H07250846 | A | 10/1995 |
| JP | 2002263118 | A | 9/2002 |
| JP | 3633980 | B2 | 3/2005 |
| KR | 10-1753165 | B1 | 7/2017 |

* cited by examiner

DEVICE COMPRISING HANDPIECE CONNECTOR HAVING FILTER COUPLED THERETO

TECHNICAL FIELD

The present disclosure relates to a device including a handpiece connector with a filter coupled thereto, that can be combined with the handpiece and has a cartridge accommodating therein a filter with an increased cross-sectional area and increased filtering efficiency, which can be replaced in a detachable manner for a disposable purpose, so that it can prevent saliva, blood, bacteria, and foreign substances that may be mixed with the air flowing along inside the handpiece from being exposed to the inside of a patient's oral cavity, causing contamination or infection, and prevent performance degradation and a fault of the handpiece caused by foreign substances accumulating inside the handpiece.

RELATED ART

Dental handpieces are largely classified as '(A) Instruments and Machines' in accordance with the Regulations on Medical Device Items and Grades for each Item (Korea Food and Drug Safety Administration Notification No. 2011-49), and belong to the secondary category A55000 'Puncturing, abrasion, and perforating instruments for medical use', and examples of the puncturing, abrasion, and perforating instruments for medical use include dental handpieces as well as various cutting and perforator-related products such as medical skin peeling devices, electric medical puncturing instruments, medical cutting tools, and the like.

Dental handpieces, like video transmission/output software, are designated as Grade 2, which corresponds to not posing a high risk to the human body. As the current classification was revised in 2009 in the 'Regulations on Medical Device Items and Grades for each Item' (Korea Food and Drug Safety Administration Notification No. 2009-2), dental handpieces were subdivided into two individual items (electric dental handpieces and air-compressed dental handpieces).

Dental handpieces are instruments used every day by dentists around the world, and handpieces are used across the world in medical procedures such as cutting teeth and removing decayed teeth in a patient's oral cavity.

According to the Korean Society of Infection Control and Prevention in Dental Hygiene's 'Dental Clinic Infection Control Guidelines', these handpieces are classified as high-risk instruments and required to be subjected to the processes of cleaning, applying lubricant, idling, and sterilizing immediately after use. However, to prepare sterilized handpieces every time a patient changes, it is necessary to have multiple handpieces and sterilizers, but due to the high cost, some dental clinics are using handpieces that have been briefly sterilized.

Such handpieces are sometimes used after being cleaned only on the exterior, and although the external structure of the handpiece has the shape of a smooth frame, the internal structure of the handpiece is very complex, so it is not likely to be used safely through external disinfection alone.

The structure of a typical conventional handpiece will be described through FIG. 1.

The handpiece 10 has a streamlined rod shape so that it can be used in dental treatment, and the head of the handpiece is equipped with a blade or drill for cutting teeth.

This handpiece is provided with a plurality of flow path pipes and a water pipe for providing a driving force to operate the handpiece and being supplied with air and washing water to spray air and washing water into the patient's oral cavity through the handpiece, and these flow path pipes and the water pipe are formed to extend from the rear part 20 of the handpiece, that is, the end portion connected to the coupling hose for supplying air and washing water to the handpiece, and to pass through the inside of the handpiece.

Referring to FIG. 2, an enlarged view P of a rear part 20 of the handpiece will be described.

The rear part of the handpiece is the end to which a coupling hose connected to a compressor for supplying air and to a tank for supplying washing water is connected, and when taking a close look at the enlarged view P of the rear part, there are a first flow path pipe 21, a second flow path pipe 22, a third flow path pipe 23, and a water pipe 24. It would be understood by those skilled in the art that the positions of the flow path pipes and water pipe are only for explanation, and any other flow path pipes for the same functions can be set in different positions depending on the designer's intention.

The first flow path pipe 21 allows air to flow in from the coupling hose toward the driving body (motor) formed inside the handpiece, and the driving body is driven through air pressure. The air which has been used for the driving is exhausted through the second flow path pipe 22.

The third flow path tube 23 is configured to allow air to flow into the patient's oral cavity to blow out tooth powder produced when cutting a molar tooth in the patient's oral cavity.

The water pipe 24 is formed to prevent overheating of the handpiece and at the same time clean the dental treatment procedure area.

The above-mentioned flow path pipes and water pipe penetrate the handpiece in the form of tubes, making it difficult to clean them, and foreign substances which might have entered the compressor for supplying air and the tank for supplying washing water pass through the inside of the handpiece without being filtered out.

Although the structure of the above-mentioned flow path pipes and water pipe is reasonably designed within the structure of the dental device to ensure maximum hygiene and ensure objective and complete stability and sealing of the fluid supplied to the devices, allowing cleaning and sterilization of the inside of the handpiece, frequent use of the handpiece may cause tolerances between parts, causing foreign substances to enter the interior. These foreign substances may enter the compressor that generates air and the tank where the washing water is stored through the hose connected to the handpiece.

Additionally, in the process of treating a patient, oral foreign substances may enter the compressor and tank reversely along the coupling hose through the pipe through which air and washing water flow, and even if the handpiece is sterilized and replaced, foreign substances which have entered the compressor and tank may enter the oral cavity of other patients.

In addition, the handpiece is hung on the operating table where the operator hangs dental equipment for the procedure, so foreign substances that were not removed may flow inside the handpiece along the coupling hose due to gravity, and this causes hygiene related problems in the process of air circulation through the flow path pipe, and the foreign substances may become stuck inside the handpiece, causing fault and contamination.

The above-mentioned problems can cause serious problems in oral hygiene, and there is such a big problem that patients can be exposed to diseases due to blood or oral foreign substances of other patients.

Additionally, foreign substances may accumulate inside the handpiece, which may degrade the performance of the handpiece and cause a fault thereof.

In order to solve the above-mentioned problems, an attempt to prevent foreign substances mixed in the air blown into the patient's oral cavity from entering the patient's oral cavity has been made by using a connector with a filter accommodated therein between the handpiece and the coupling hose through which air and washing water flow in to prevent the patient from being exposed to disease, and increase oral hygiene, cleanliness, and the convenience of the operator, and however, conventional plate-shaped or cylindrical filters had a small filtering surface area, so the filtering effect was slight, and there was a problem in that the filters were easily separated due to pressure.

Therefore, there is a need for a device that includes a handpiece connector combined with a filter that can effectively filter the air circulating through the handpiece and the air used in the patient's oral cavity.

SUMMARY

Technical Problems

The purpose of the present disclosure is to prevent contamination and the accumulation of foreign substances inside the handpiece by providing a connector having a filter accommodated therein and being coupled to the handpiece, and to handle the foreign substances at once by collecting them into a replaceable cartridge.

In addition, the purpose is to maintain the hygiene of the dental environment through filtering and promote the patient's oral health by providing a detachable filter with an increased cross-sectional area to blow clean air into the patient's oral cavity.

Technical Solving Method

In a device including a handpiece connector with a filter coupled thereto according to the present disclosure, the connector includes: a first cartridge part including a plurality of flow path parts facing the handpiece and the hose; a second cartridge part including an internal space into which the first cartridge part penetrates; and a filter part formed in the internal space to filter air passing through the flow path parts, and the filter part filters the air discharged from the flow path parts located within the filter part in radial directions toward the internal space, and the filtered air is sucked into the handpiece.

According to the present disclosure, the flow path parts includes: a first flow path part which receives air from the hose and discharges the air to drive the handpiece; a second flow path part through which the air that has been discharged from the first flow path is exhausted; a third flow path part which receives air from the hose and discharges the air to be used in an oral cavity; and a fourth flow path part through which washing water flows from the hose.

According to the present disclosure, the filter part includes a filter having a plurality of wrinkles, an upper cap, and a lower cap, the both caps supporting the filter, and the first flow path part and the third flow path part are positioned within the filter part.

According to the present disclosure, the second flow path part and the fourth flow path part penetrate the upper cap and communicate with the handpiece.

According to the present disclosure, the upper cap includes a second flow path hole and a fourth flow path hole through which only the second flow path part and the fourth flow path part penetrate.

According to the present disclosure, the air which has been discharged from the first flow path part and the third flow path part and filtered is sucked into corresponding flow path pipes of the handpiece through a distance.

According to the present disclosure, the second flow path part and the fourth flow path part are in communication with the corresponding flow path pipe and washing pipe of the handpiece.

Effects of the Invention

The present disclosure has the effect of preventing performance degradation and fault caused by the accumulation of foreign substances inside the handpiece, and in addition, has the effect of maintaining patient's oral hygiene and preventing exposure to disease caused by the foreign substances being mixed in the air by the hose, the compressor, both connected to the handpiece, and external factors and being introduced into the inside of the handpiece and the patient's oral cavity.

In addition, there is the effect of carrying out effective filtering through the filter part including a filter with an increased area for filtering.

DETAILED DESCRIPTION

Hereinafter, embodiments of the present disclosure will be described in detail such that those of ordinary skill in the art can easily practice them. However, the disclosure can be embodied in various different forms, and the scope of the disclosure should not be construed as being limited to the embodiments described herein.

As used herein, the terms are for the purpose of describing the embodiments, and thus, are not intended to limit the present disclosure. Herein, terms in the singular form also relate to the plural form unless specifically stated otherwise in the context. As used herein, the terms "comprise" and/or "comprising" specify the presence of stated components, steps, operations, and/or elements, but do not preclude the presence or addition of at least one other component, step, operation, and/or element.

A device including a handpiece connector coupled with a filter according to the present disclosure is to prevent foreign substances mixed in the air discharged from a handpiece 100 used by an operator in the patient's oral cavity during dental treatment from being introduced into the inside of the handpiece 100 and the patient's oral cavity, and to prevent problems such as performance degradation and faults caused by the accumulation of foreign substances inside the handpiece 100.

More particularly, it is to maintain patient's oral hygiene and prevent exposure to disease by preventing foreign substances mixed in the air by a hose 200, a compressor, both connected to the handpiece 100, and external factors from being introduced into the inside of the handpiece 100 and the patient's oral cavity, and to solve the problem such as performance degradation and fault of the handpiece 100 caused by the foreign substances.

Figure 12:
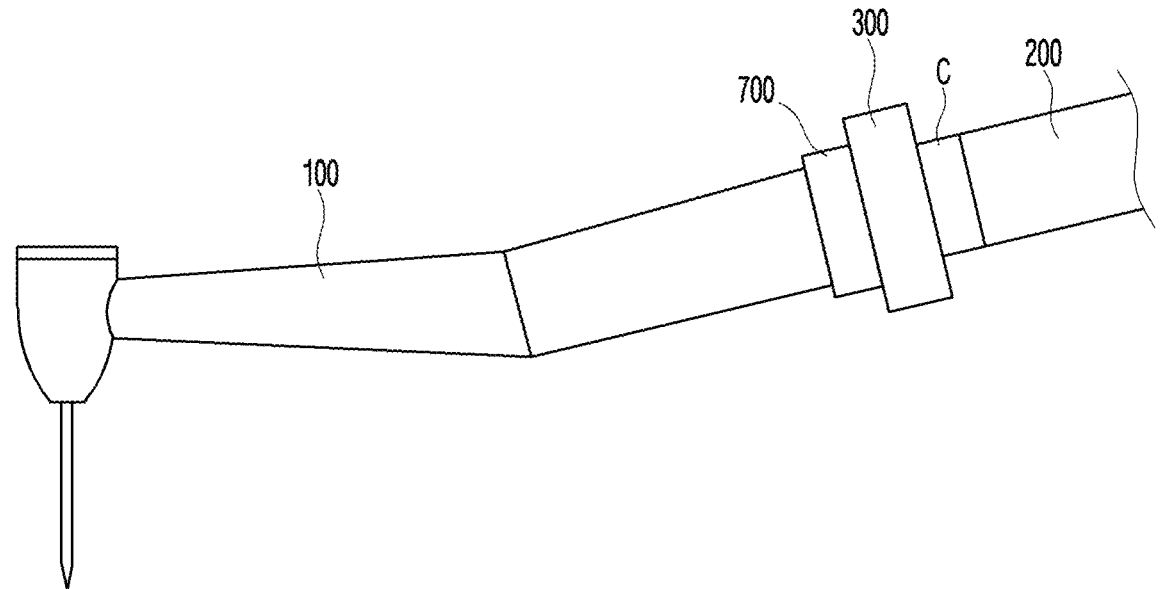
FIG. 12 is a perspective view of the configuration of the present disclosure in a combined state.

Referring to FIGS. 6 to 9 and to FIG. 12 which shows the final assembled state of a device including a connector 300 to which a filter according to the present disclosure is coupled, the present disclosure includes a handpiece 100, a hose 200, a connector 300, a filter part 400, an insertion part 500, a fixing part 600, a first sealing part 700, a second sealing part 800, and a coupling C.

As will be described later, the filter part 400 is located within a second cartridge part 320 of the connector 300, and the filter part 400 is detachable and is preferably used for disposable purposes.

Here, the term "disposable purpose" refers to an item which is designed for a single use per patient during dental treatment and for being discarded after the treatment. This has the effect of solving hygiene related problems and increasing the reliability of dental treatment.

The connector 300 of the present disclosure is located between the handpiece 100 and the hose 200 to pre-filter and collect foreign substances mixed in the air flowing in from the hose 200, and to provide air, from which foreign substances are filtered out, into the inside the handpiece 100, providing a driving force to an driving body inside the handpiece 100, so that it can provide clean air to the patient's oral cavity, thereby enabling the prevention of cross-infection during dental treatment.

In addition, in the present disclosure, it is preferable that the connector 300 is connected to and located in an end portion where the handpiece 100 and the hose 200 are connected, and it is preferable that the filter part is replaceable by disconnecting the handpiece 100 and the hose 200 from the connector 300 so that the connector 300 or the internal filter part 400 can be replaced.

The connector 300 includes a first cartridge part 310 and a second cartridge part 320.

The first cartridge part 310 of the connector 300 will be described with reference to FIG. 3. The first cartridge part 310 includes a threaded connection body part 311 and a plurality of flow path parts.

For convenience of explanation, the flow path parts are described as a first flow path part 312, a second flow path part 313, a third flow path part 314, and a fourth flow path part 315.

Based on the illustration in FIG. 3, the upper end portion of the connection body part 311 from which the flow path parts protrude is in communication with the second cartridge part 320, which will be described later, and is directly or indirectly connected to the handpiece 100, and it is preferable that the hose 200 for supplying air and washing water to the handpiece 100 is connected to the lower end portion where the thread is formed.

It is preferable that the connection body part 311 is formed such that a plurality of flow path parts for receiving the above-mentioned air and washing water communicate with the hose 200 inside the hose.

Air flows in from the hose 200 into the first flow path part 312, and the air introduced through the first flow path part 312 is provided as a driving force to drive the motor for operating the handpiece 100, and is discharged and exhausted through the second flow path part 313. That is, it is preferable to have a circulation structure in which the air supplied through the first flow path part 312 to be used to drive the driving body (not shown), i.e., the motor, is exhausted through the second flow path part 313.

The third flow path part 314 is a structure that allows air flow to be sprayed for removing oral foreign substances, such as tooth powder and blood, generated in the patient's oral cavity, which obstruct the view of the treatment region, and air is also supplied from the hose 200 to the third flow path part 314, and flows to the handpiece 100 and is blown into the patient's oral cavity.

The fourth flow path part 315 can spray the washing water supplied from the hose 200 into the patient's oral cavity, and has the feature of lowering the overheated temperature of the handpiece 100 through the washing water.

It is preferable that the plurality of flow path parts described above are positioned separately and are understood to be configured to receive air and washing water respectively from the hose 200 without being in communication with each other.

In addition, each role of the flow path parts may be assigned to another flow path part at a different location depending on the designer's intention, and the position of each flow path part may be simply changed in design, and the technical idea of the present disclosure would be still applicable even if the role of the flow path part according to its position is changed.

Figure 1:
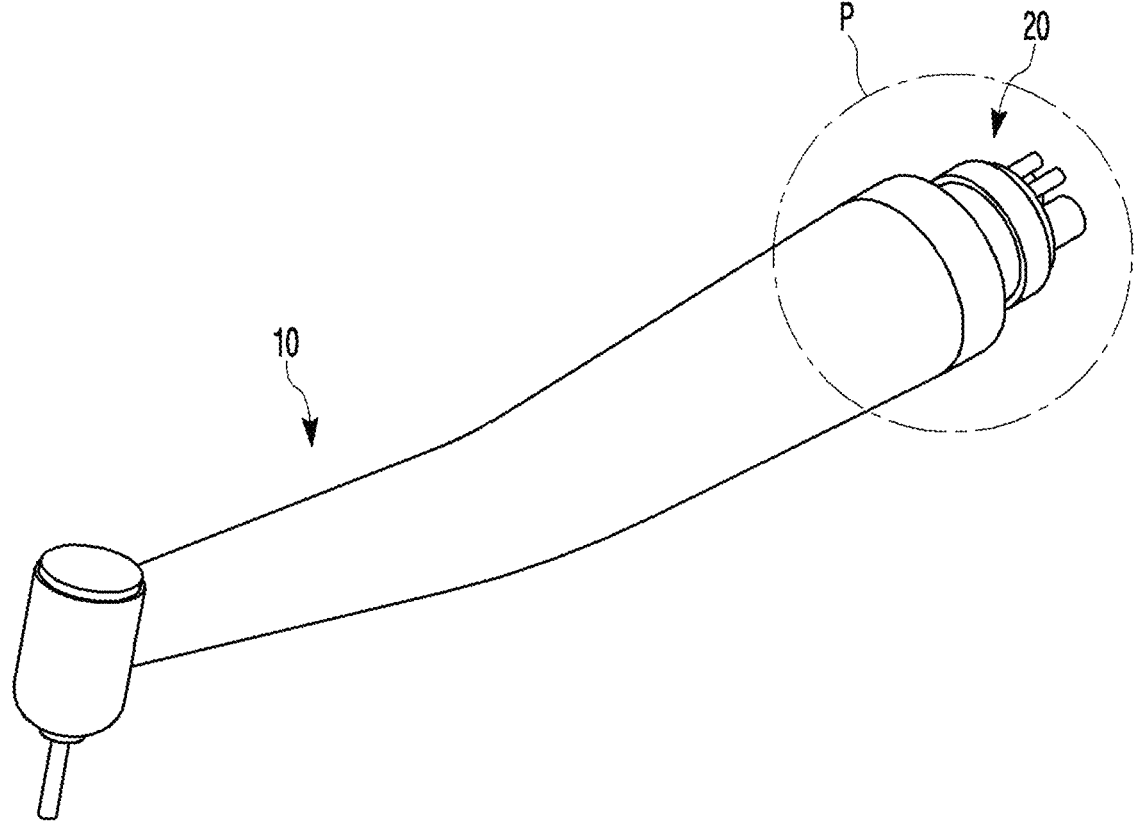
FIG. 1 is a diagram for explaining a conventional handpiece.
Figure 2:
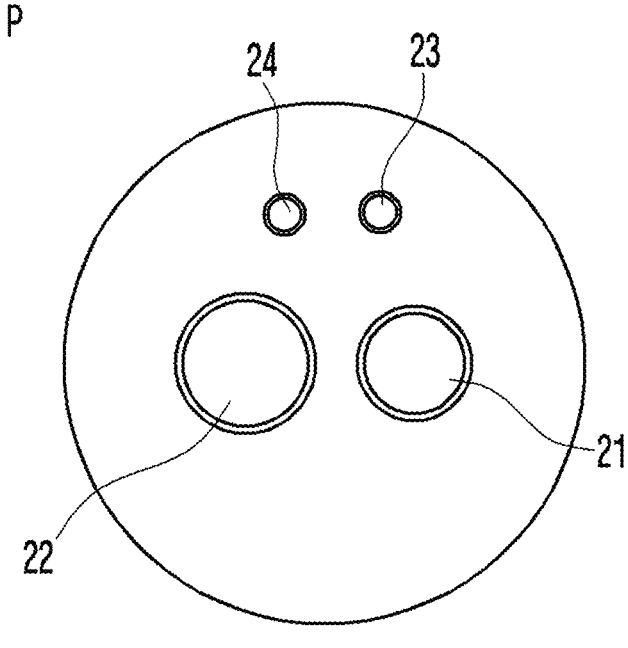
FIG. 2 is a diagram for explaining a rear part of a conventional handpiece that receives air and washing water.
Figure 3:
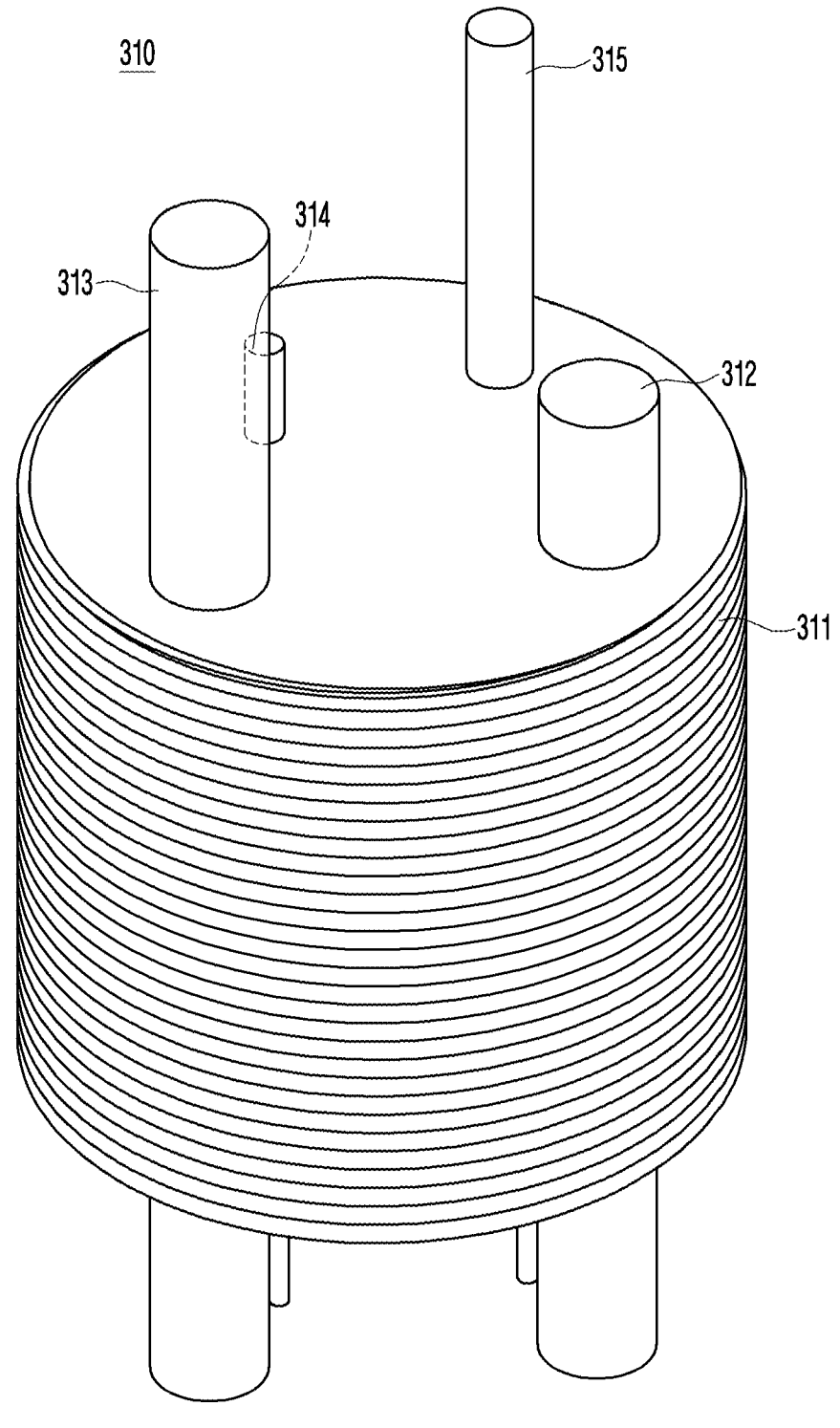
FIG. 3 is a diagram for explaining a first cartridge part of the present disclosure.

As shown in FIG. 3, the lengths of the respective flow path parts are different from each other, and this will be described later.

Due to the feature that air flows into the inside of the handpiece 100 and the oral cavity, if foreign substances are mixed in the air, foreign substances may accumulate inside the handpiece 100 and cause its fault.

Also, there may be such a disadvantage that foreign substances and bacteria are introduced into the patient's oral cavity, causing oral cavity cleanliness related problems and exposing the patient to disease.

Therefore, the filter part 400 of the present disclosure can filter out foreign substances, which otherwise would flow into the flow path parts and be mixed in air, to provide the air from which the foreign substances have been removed as a driving force for operating the handpiece 100, and to provide such clean air to the oral cavity of the patient.

Figure 4:
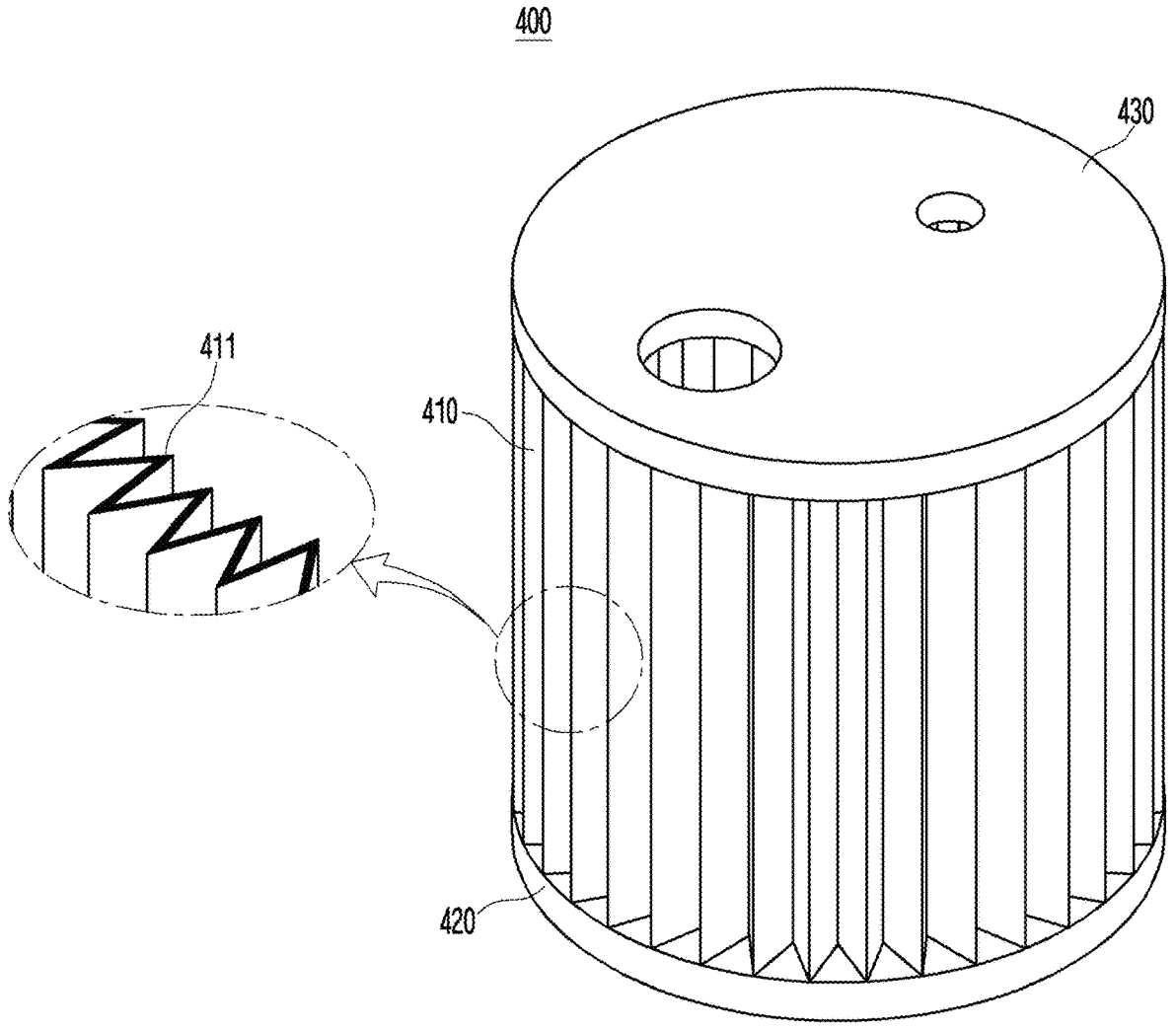
FIG. 4 is a diagram for explaining a filter part of the present disclosure.

Referring to FIG. 4, a filter part 400 that filters out foreign substances, for this purpose, which otherwise would be mixed in air, is shown.

The filter part 400 includes a filter 410 with a plurality of wrinkles 411 formed thereon, an upper cap 430 and a lower cap 420, wherein the both caps support the filter 410.

The filter 410 is formed such that the plurality of wrinkles 411 form a closed curved surface which prepares a space therein. The lower cap 420 is coupled to the lower end of the filter part 400, and the upper cap 430 is coupled to the upper end thereof.

Figure 5:
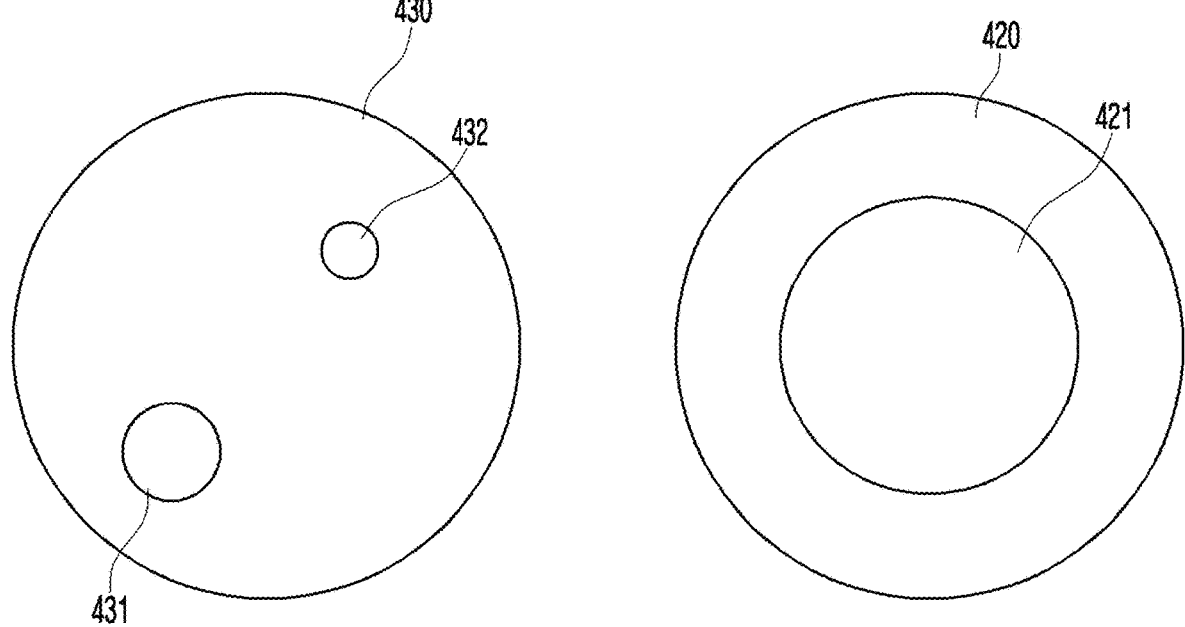
FIG. 5 is a diagram for explaining an upper cap and a lower cap of the present disclosure.

The lower cap 420 and the upper cap 430 will be described with reference to FIG. 5.

The lower cap 420 may complementarily correspond and be coupled to the diameter of the filter part 400, and may preferably have a communication hole 421 formed therein such that the above-described flow path parts can pass through the inside of the filter 410.

It is preferable that the communication hole 421 has a diameter so that a portion of the upper end of the connection body part 311 can penetrate therethrough, and for airtightness, the communication hole 421 is inserted onto the outer surface of the connection body part 311 so as to be close enough to engage with the outer surface, thereby blocking the inflow of air from the outside to increase airtightness.

The upper cap 430 is complementarily coupled to the upper end of the filter 410, and has a second flow path hole 431 and a fourth flow path hole 432 through which the above-described second flow path part 313 and fourth flow path part 315 pass, respectively.

Through the second flow path hole 431 and the fourth flow path hole 432, the second flow path part 313 and the fourth flow path part 315 penetrate the upper cap 430, and the second flow path part 313 and the fourth flow path part 315 are connected to a flow path pipe and the washing pipes P1 to P4 of the handpiece 100 to form an air circulation structure.

That is, the upper cap 430 has such an airtight structure that only the second flow path part 313 and the fourth flow path part 315 penetrate the upper cap 430 to communicate with the handpiece 100, while when the first flow path part 312 and the third flow path part 314 located inside the filter part 400 discharge air, the air passes through the filter 410 and is filtered.

Figure 11:
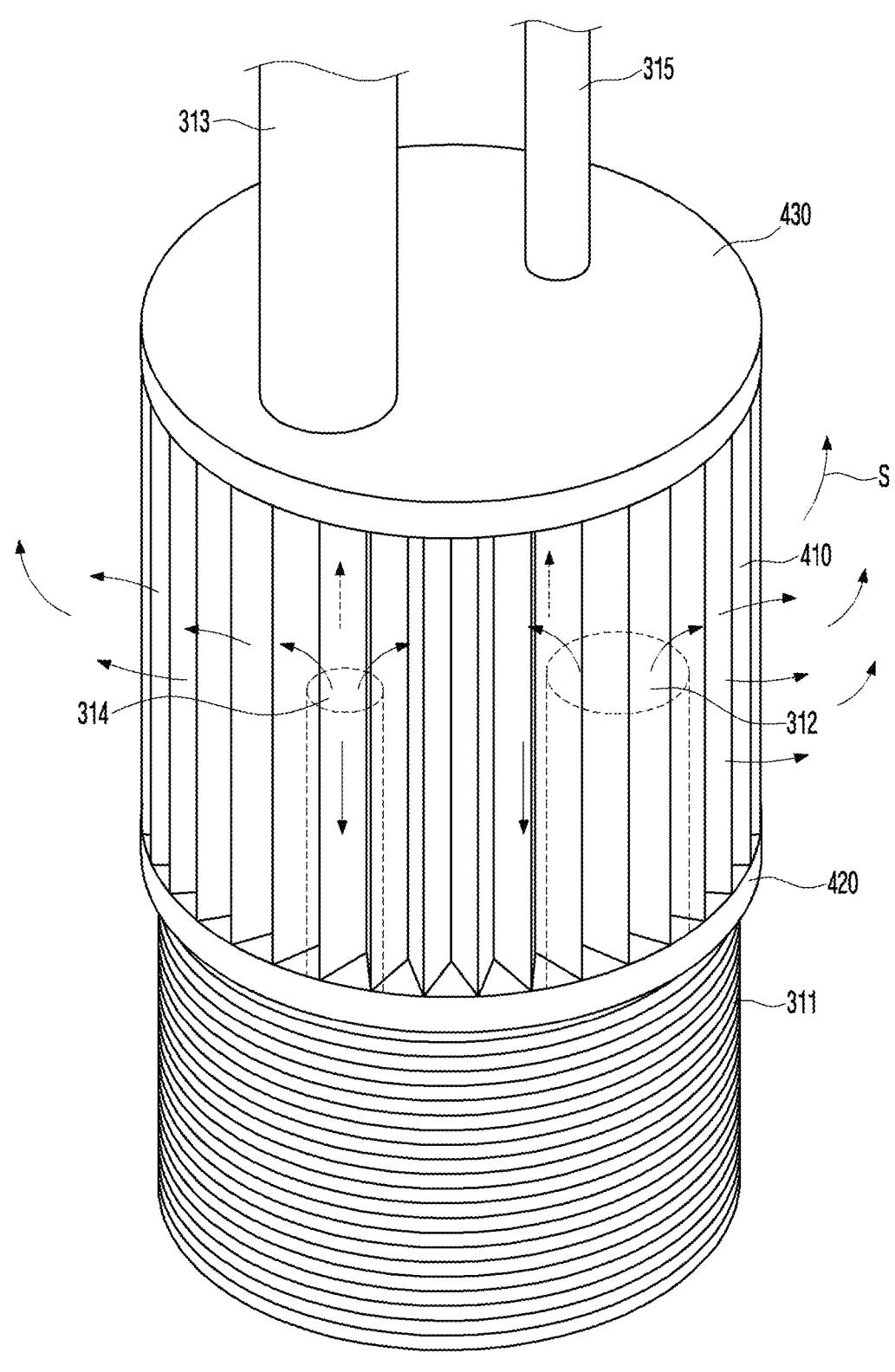
FIG. 11 is a diagram for explaining the filtering of air passing through flow path parts and through the filter part of the present disclosure.

That is, referring to FIG. 11, the filter part 400 can be internally airtight through the upper cap 430 and the lower cap 420, and can filter the air discharged from the first flow path part 312 and the third flow path part 314 and necessary for the air filtering. A detailed explanation will be provided later.

In this regard, it is preferable that the second flow path part 313 and the fourth flow path part 315 have relatively longer lengths than those of the first flow path part 312 and the third flow path part 314 in order to penetrate the upper cap 430, and there is no particular restriction to the lengths of the first flow path part 312 and the third flow path part 314 as long as the lengths of first flow path part 312 and the third flow path part 314 are set such that preferably both flow path parts are located within the filter part 400.

The second cartridge part 320 will be described with reference to FIGS. 6 and 7. The second cartridge part 320 includes a first support part 321 and a second support part 322.

Figure 6:
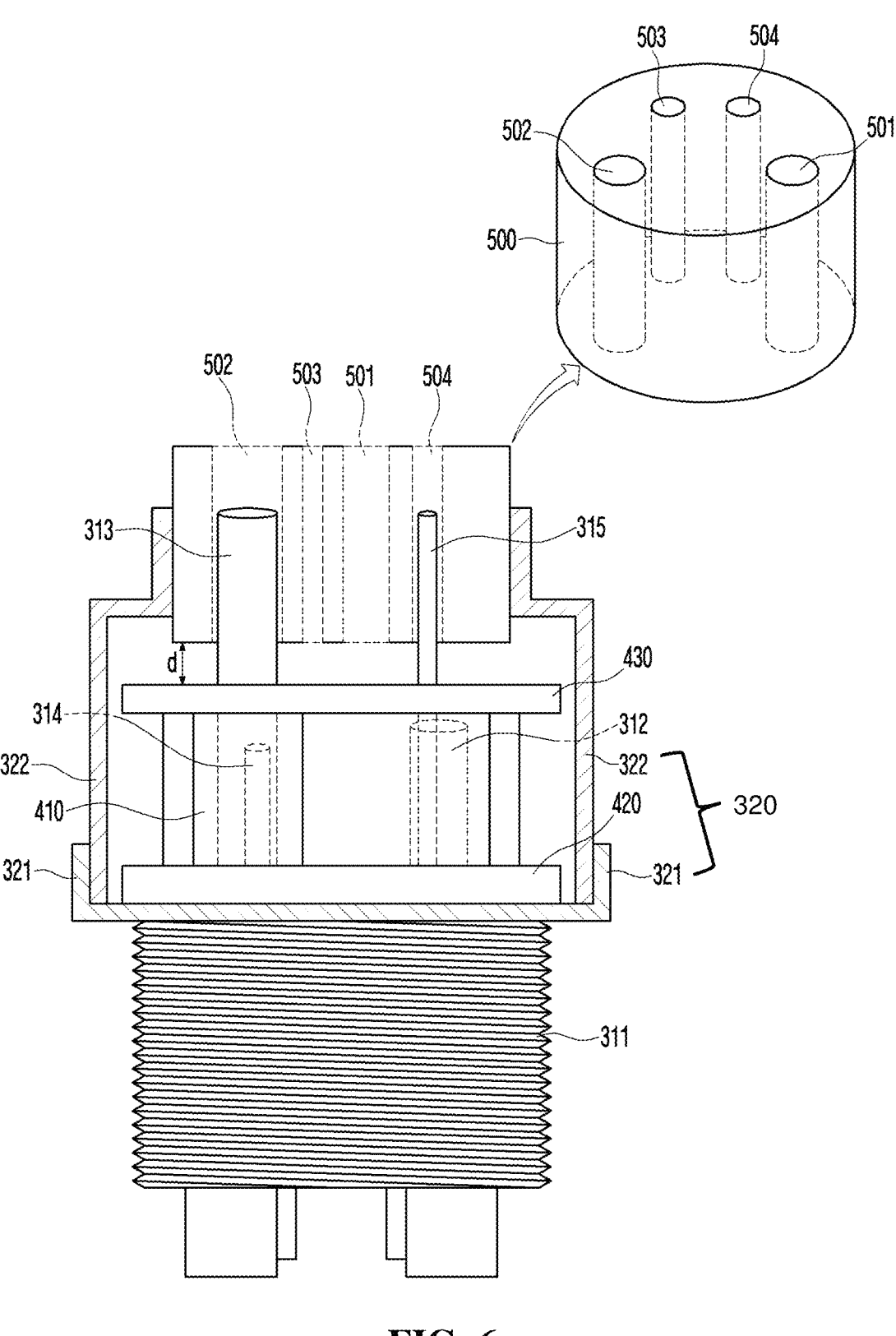
FIGS. 6 to 10 are diagrams for explaining the coupling relationship between a first cartridge part, a second cartridge part, a handpiece, a fixing part, a first sealing part, and a second sealing part of the present disclosure.

Referring to FIG. 6, it shows a cross-section of the connector 300 with the filter part 400 installed therein, wherein the first support part 321 has a cylindrical shape with an open top, and a side wall protruding upward is formed on the outer peripheral surface.

Although not shown, it is preferable that the first support part 321 has a structure which allows the flow path parts of the first cartridge part 310 to be inserted therethrough.

The second support part 322 preferably has a cylindrical shape with an open lower surface and a space therein.

It is preferable that the lower outer peripheral surface of the second support part 322 abuts the side wall of the above-described first support part 321 and is coupled thereto through a joining process, and through this, the first support part 321 and the second support part 322 are coupled to each other to form a sealed internal space in which the filter part 400 can be installed.

This coupling structure can increase the coupling force to be firmly supported and coupled without being separated from each other even under high pressure.

When the first support part 321 and the second support part 322 are coupled to each other, it is preferable that an internal space in which the filter part 400 can be located is formed, and it is preferable that the first cartridge part 310 penetrates the internal space toward the lower cap 420 of the filter part 400 (It is preferable that the vertical length of the filter part 400 can be set such that the internal space where the filter part 400 is located has optimal filter efficiency, and the size and position of the filter part 400 within the space can be adjusted).

More specifically, after connecting and communicating the plurality of path parts of the first cartridge part 310 and the first support part 321 to each other, the filter part 400 is positioned on the upper part of the first support part 321 so that the first cartridge part 310 is inserted into the lower cap 420 (At the point of the first support part 321 through which the first cartridge part 310 penetrates, airtightness can be achieved through threaded coupling of the connection body part 311 of the first cartridge part 310 and the first support part 321 through threads or joining members).

In this state, the second support part 322 is coupled to position the filter part 400 in the internal space formed by the first support part 321 and the second support part 322.

It is preferable that the upper side of the second support part 322 is also configured to communicate with the flow path parts, and the side wall part is formed to protrude and open at the top in a circular shape at a point on the upper side of the second support part to surround the outside based on the penetrating second flow path part 313 and the fourth flow path part 315, and the insertion part 500, in which a plurality of insertion holes are formed, is inserted into the side wall part in an interference fit state with a tolerance.

Referring to FIG. 6, the insertion part 500 has a circular cylindrical shape and has a plurality of insertion holes formed therein, and for explanation, the insertion holes are described as a first insertion hole 501, a second insertion hole 502, a third insertion hole 503, and a fourth insertion hole 504, and the insertion part is located in the form of being inserted into the open upper end of the second support part 322.

When the insertion part 500 is inserted into the upper end of the second support part 322, the second flow path part 313 and the fourth flow path part 315 are inserted into the second insertion hole 502 and the fourth insertion hole 504, respectively.

As will be described later, the insertion part 500 has a communication structure in which the flow path pipe and the washing pipe P1 to P4 of the handpiece 100 are inserted into the insertion holes from the upper side with respect to the insertion part 500, and only the second flow path part 313 and the fourth flow path part 315 of the first cartridge part 310 are inserted into the lower end of the insertion part 500.

That is, the insertion part 500 communicates with the handpiece 100, and is a member connected between the handpiece 100 and the first cartridge part 310 to communicate with the second flow path part 313 and the fourth flow path part 315, and it is preferable that the insertion part 500 is formed with corresponding insertion holes 501 to 504 separated to achieve the above-described fluid circulation structure of the flow path parts for driving and functioning of the handpiece 100.

In addition, in the cross-sectional view of FIG. 6, the first insertion hole 501 to the fourth insertion hole 504 are simultaneously displayed on a planar cross-section for understanding, and even though they are displayed on a plane, it is desirable to understand the positions of the insertion hole as shown in the three-dimensional shape of the insertion part 500.

Figure 7:
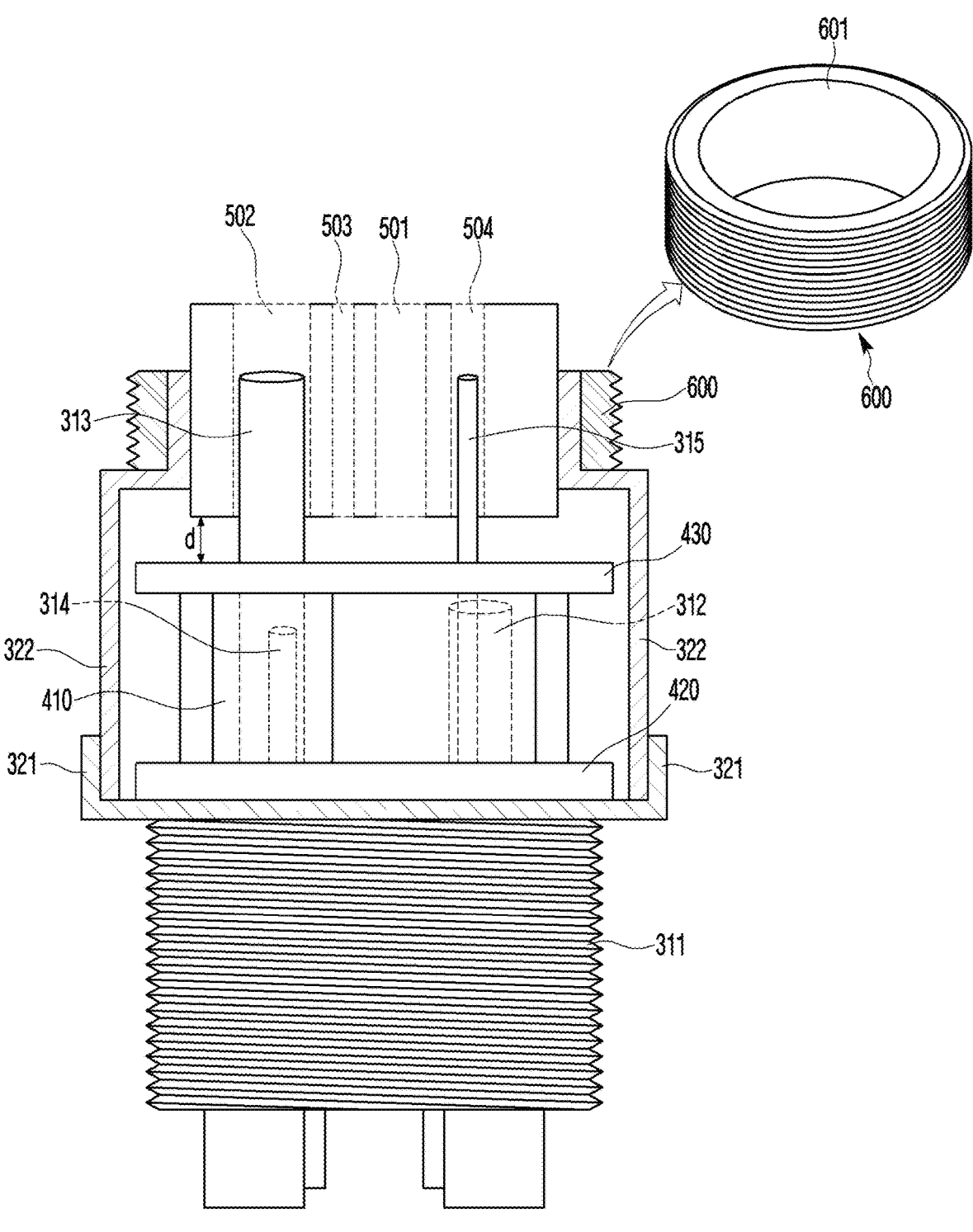

Referring to FIG. 7, a fixing part 600 is shown that closely supports the insertion part 500 and the second support part 322 and has threads formed on the outer surface for coupling the first sealing part 700, which will be described later.

It is preferable that the fixing part 600 is formed with a fixing hole 601 for being coupled to the outer surface of the second support part 322 into which the insertion part 500 is inserted, and the fixing part can fix the handpiece 100 tightly by being coupled to the first sealing part 700, which will be described later, through a thread on the outer surface.

Figure 8:
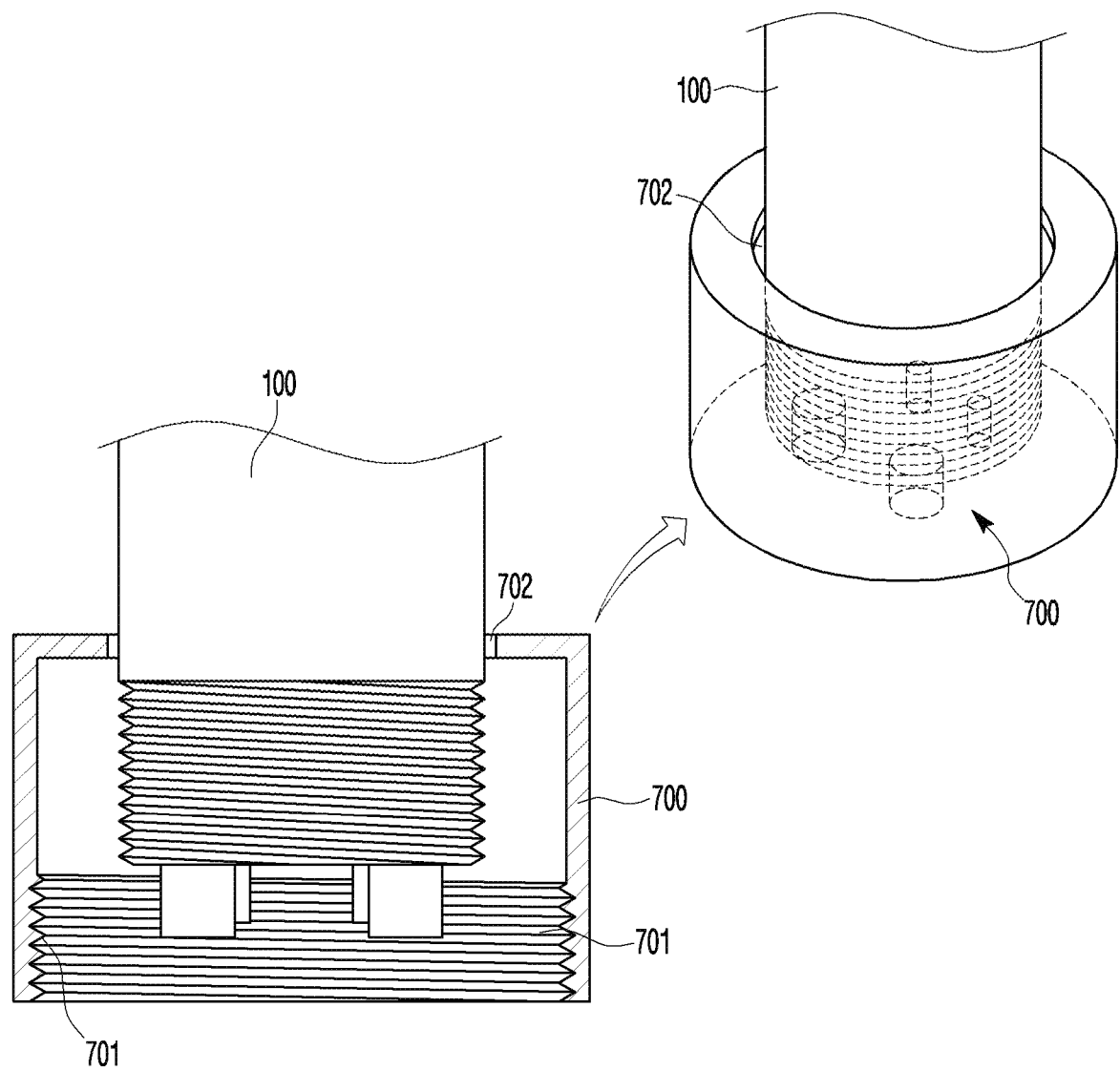

The first sealing part 700 and the second sealing part 800 coupled to the handpiece will be described with reference to FIG. 8.

It is preferable that the first sealing part 700 has a cylindrical shape and has a sealing groove 702 into which the handpiece 100 can be inserted.

In addition, a first sealing fastening part 701 having a thread formed thereon is formed on the lower inner surface of the first sealing part 700 to be connected to the above-described fixing part 600.

In this regard, the sealing groove 702 is formed larger than the diameter of the outer peripheral surface of the handpiece 100, and for example, it is preferable to have a diameter that allows the upper end of the second sealing part 800 coupled with the handpiece 100 to pass therethrough, and a detailed description will be provided later.

Figure 9:
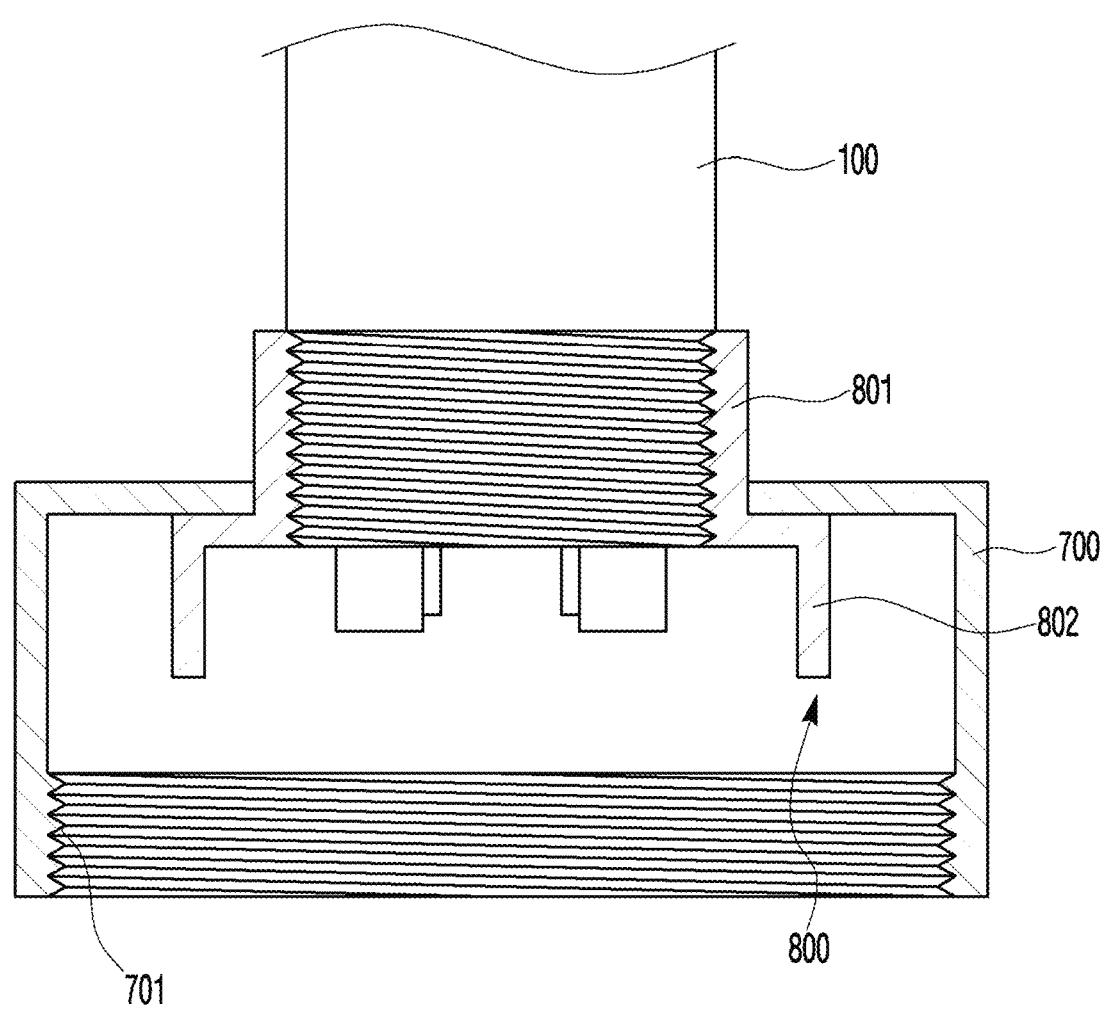

Referring to FIG. 9, the second sealing part 800 coupled to the lower end of the handpiece 100 is shown.

The upper end of the second sealing part 800 is formed with a second sealing fastening part 801 that surrounds the outer peripheral surface of the handpiece 100 and is screwed thereto, and the lower end has such a diameter that it can be supported in contact with the protruding end portion of the second support part 322 described above.

When the handpiece 100 and the second sealing fastening part 801 are combined to each other and pass through the sealing groove 702, it is preferable that the inner end of the first sealing part 700 is engaged with the step dividing the upper and lower sides of the second sealing part 800, and the sealing groove 702 preferably has such a diameter that it can be adjacent to and correspond to the diameter of the shape in which the second sealing fastening part 801 surrounds the handpiece 100, and it is preferable to be able to utilize washers and fixing members according to the designer's intention.

This coupling structure can be firmly fixed so that the handpiece 100, the first sealing part 700, and the second sealing part 800 can be coupled at the position where they should be coupled, through which damage to the handpiece 100 that may occur due to incorrect coupling can be prevented.

The lower end of the second sealing part 800 includes a second sealing step 802, which is stepped to be positioned in contact with the upper end of one end of the second support part 322 where the above-described insertion part 500 of the second support part 322 is inserted, and the second sealing step 802 preferably has a diameter that can be supported in contact with the upper end of the second support part 322.

Figure 10:
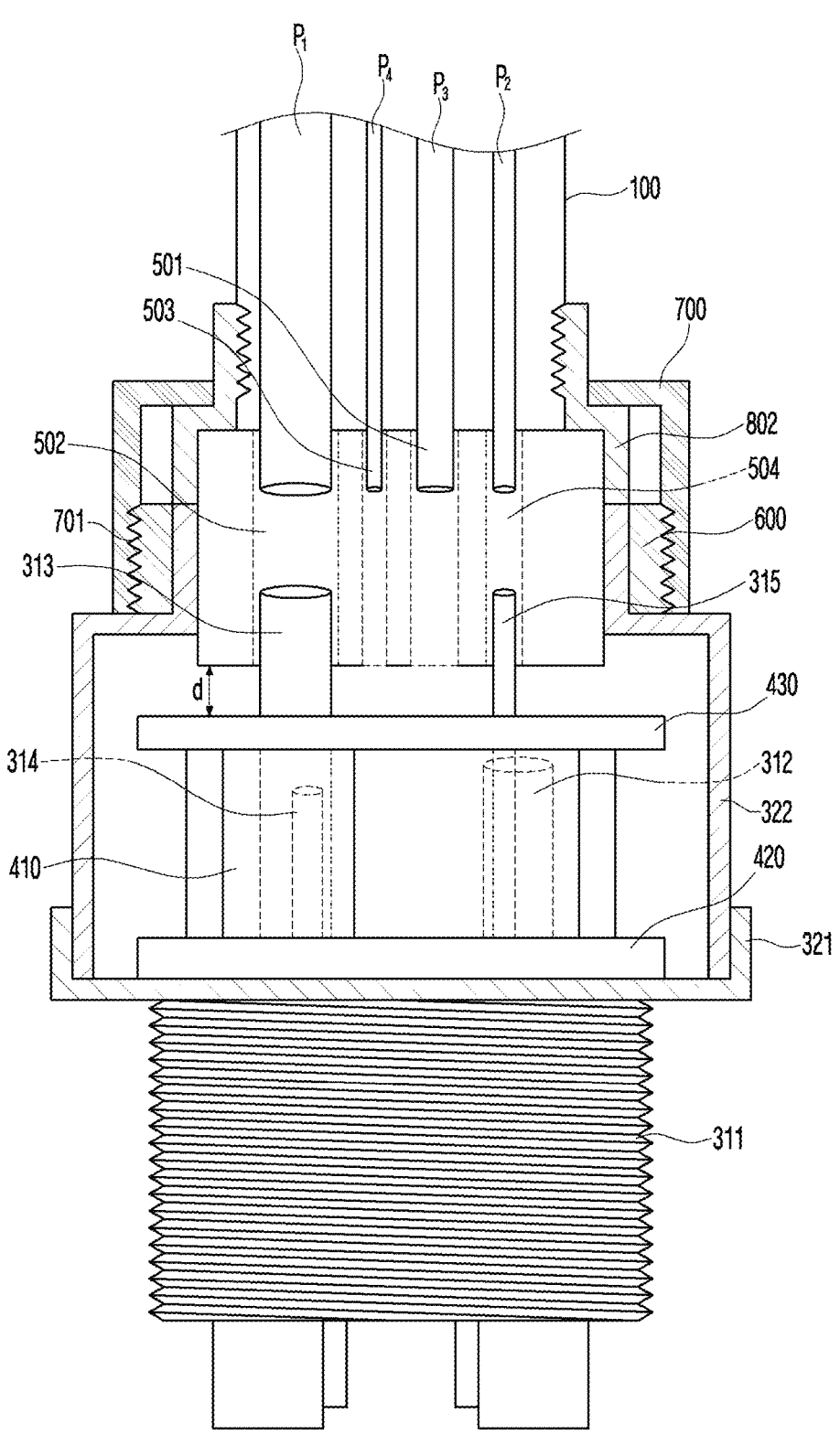

To explain this, referring to FIG. 10, the first sealing fastening part 701 is screwed to the outer thread of the fixing part 600. Here, the second sealing fastening part 801 is coupled to the upper end of the insertion part 500 in a complementary manner, and the second sealing step 802 is positioned in contact with the upper end of the second support part 322.

Through this, the flow path pipes P1, P3 and P4 and the washing pipe P2 of the hand piece 100 are inserted into the first insertion hole 501 to the fourth insertion hole 504 at corresponding positions.

As shown in FIG. 10, the second flow path part 313 and the flow path pipe P1 of the hand piece 100 are inserted into the second insertion hole 502 and communicate with each other through the second insertion hole 502.

The fourth flow path part 315 through which washing water flows and the washing pipe P2 are connected to the fourth insertion hole 504, and connected to each other via the fourth insertion hole 504.

That is, the flow path pipe P1 for exhausting the handpiece 100 and the washing pipe P2 for spraying washing water are directly connected through the second insertion hole 502 and the fourth insertion hole 504.

In contrast, the first flow path part 312 and the third flow path part 314 are located inside the filter part 400.

First, the filter part 400 of the present disclosure may employ a high-performance filter such as a known HEPA filter or ULPA filter to maximize the filtering effect. A kind of publicly known filter material can be used as the filter part 400, and it may be selectively utilized depending on the intention of the user or designer.

The filter 410 has the multiple wrinkles 411, which increase the unit area of the filter compared to a conventional circular or simple plate-shaped stacked filter. This increases the surface area that can be used for filtering, effectively filtering out foreign substances in the air, and since a larger amount of air can be filtered, constant filtering performance can be maintained even if the treatment time is prolonged.

Referring to FIGS. 10 and 11, the filter part 400 of the present disclosure and the circulation structure for filtering foreign substances through the filter part 400 will be described in detail.

The first flow path part 312 and the third flow path part 314 are located inside the filter part 400 of the present disclosure.

First, as for the first flow path part 312, air pressure is applied by a power device such as an external compressor, and the air flows through the first flow path part 312.

However, since the present disclosure is a device for use in dental treatment using high-speed RPM, when foreign substances that may be generated from an external compressor enter the handpiece 100, it may cause fault of the handpiece 100, which may lead to momentary failure in the patient's surgical environment and delicate dental treatment, posing a risk to the patient's oral cavity.

Therefore, the air provided as a driving force to the handpiece 100 through the first flow path part 312 is required to be filtered.

Accordingly, the first flow path part 312 discharges air in the inside of the filter part 400, and the discharged air flows from the inside of the filter part to the outside through the filter 410, and the air flowing to the outside moves upward along the internal space, and passes through the first insertion hole 501 of the insertion part 500 corresponding to the flow path part 312, and is sucked and moved to the flow path pipe P3 of the handpiece 100 to operate the handpiece 100.

Afterwards, the air that has operated the handpiece 100 is exhausted through the second flow path part 313.

At this time, the second flow path part 313 is communicated with and connected to the corresponding flow path pipe P1 of the handpiece 100 through the second insertion hole 502 to discharge air through the hose, and the reason why exhaust is made by direct connection is that the air that has already been filtered through the first flow path part 312 circulates only inside the handpiece 100, and no additional foreign substances are introduced in the air during the exhaust process, and its cleanliness is maintained.

Additionally, in the first insertion hole 501, the second flow path part 314 and the flow path pipe P1 are spaced apart from each other, but the first insertion hole 501 serves as a medium through which the second flow path part 314 and the flow path pipe P1 are communicated with each other and tightly connected to each other.

Through this, air from which foreign substances have been removed circulates through the handpiece 100 to prevent the fault of the handpiece 100, and foreign substances are not accumulated inside the handpiece 100, thereby increasing the durability.

The third flow path part 314 is a means of removing foreign substances generated during dental treatment by discharging air into the patient's oral cavity, and the air flowing through the third flow path part 314 is blown into the patient's oral cavity, so if foreign substances are mixed with that air, it causes contamination inside the oral cavity.

To prevent this, the length of the third flow path part 314 is also adjusted so that air can only be blown in the inside of the filter part 400, thereby allowing the air to be radially filtered from the inside to the outside through the filter 410 to filter out foreign substances, and the filtered air is sucked by being discharged at a distance from the flow path pipe P4 of the hand piece 100 corresponding to the third flow path part 314 in the internal space by the third flow path part 314. In addition, the respective flow path parts and the respective flow path pipes inserted into the insertion holes appear to be partially spaced apart from the inner surfaces within the insertion holes in the drawings, but this is shown to aid understanding, and it is preferable that the inner surfaces of the actual insertion holes form an airtight structure in close contact with the flow path parts and the flow path pipes.

At this time, the insertion part 500 in which the insertion holes are formed has a distance d by which it is spaced apart from the upper cap 430. If the insertion part 500 is in contact with the upper cap 430, the air discharged from the first flow path part 312 and the third flow path part 314 is prevented from being sucked into the handpiece 100 due to the first insertion hole 501 and the third insertion hole 503 being blocked.

Therefore, the suction of air can be facilitated through the distance d by which the insertion part is spaced apart from the upper cap, allowing the filtered air to flow into the handpiece 100.

The fourth flow path part 315 is a means of ejecting washing water into the patient's oral cavity and is directly connected to the corresponding washing pipe P2 of the handpiece 100 through the fourth insertion hole 504, and foreign substances are separately removed from the washing water flowing through the fourth flow path part 315 through a filter in the washing water tank, so that clean washing water can be used in the patient's oral cavity.

Additionally, when connecting the handpiece, the connector 300, the first sealing part 700, and the hose 200 of the present disclosure, a coupling C may be connected to the end where each component is connected for additional coupling force, and the effect of increasing the airtightness of the coupling can be achieved by combining the coupling C.

The coupling structure of the coupling C is a known technology and, preferably, can be used selectively according to the intention of the user and designer.

The fastening structures of the above-described first sealing part 700 and the second sealing part 800 increase the coupling force through a multi-thread fastening structure despite the pressure generated when filtering the air blown out through the first flow path part 312 and the third flow path part 314 through the filter part 400.

Through this, the internal pressure is maintained constant, so that a smooth circulation structure can be achieved through the pressure of the fluid.

In addition, airtightness is improved, so that dust and foreign substances introduced from the outside can be effectively prevented from entering the interior where the filter part 400 is positioned.

In summary, the handpiece 100, the connector 300, and the hose 200 have the advantage of being firmly connected to each other through multi-threaded coupling without being separated from each other even under the pressure of spraying air and washing water, and they have the effect of preventing foreign substances from entering from the outside by maintaining the airtightness.

It has the effect of promoting the patient's oral health because it provides air after filtering out foreign substances and bacteria which may be contained in the air sprayed from the conventional handpiece 100, and has the effect of improving the quality of dental treatment by ensuring hygiene during dental treatment by solving the hygiene related problems.

In summary, the present disclosure can be configured as a separable combination type between the handpiece 100 and the hose 200, and can be replaced immediately after treating one patient, which provides the effect of enabling hygienic management.

In addition, the air is filtered by the filter part 400 to prevent foreign substances which otherwise would be accumulated inside the handpiece 100, and when blowing air into the patient's oral cavity, foreign substances and bacteria are removed by the clean air, thereby providing the effect of preventing foreign substances from being introduced into the patient's oral cavity.

In addition, convenience is increased by simply disconnecting the connector 300 and replacing it for a disposable purpose, and there is such an advantage that aggregated foreign substances can be easily removed by simply replacing the filter part 400.

Therefore, the present disclosure can have the effect of ensuring maximum hygiene during dental treatment by designing the connector 300, the first sealing part 700, and the second sealing part 800 connecting the handpiece 100 and the hose 200 to be separable and used for a disposable purpose, and of keeping the handpiece 100 clean and maintaining optimal conditions for medical hygiene by ensuring objective and complete stability and sealing of the fluid supplied to the handpiece 100.

While the preferred embodiments of the present disclosure have been described in detail until now, the scope of the patent right of the present disclosure is not limited thereto, but various modifications and improvements which could be made by those skilled in the art using the basic concept of the present disclosure defined in the following claims would also fall within the scope of the patent right of the present disclosure.

INDUSTRIAL APPLICABILITY

The present disclosure relates to a device including a handpiece connector with a filter coupled thereto, that can be combined with the handpiece and has a cartridge accommodating therein a filter with an increased cross-sectional area and increased filtering efficiency, which can be replaced in a detachable manner for a disposable purpose, so that it can prevent saliva, blood, bacteria, and foreign substances that may be mixed with the air flowing along inside the handpiece from being exposed to the inside of a patient's oral cavity, causing contamination or infection, and prevent performance degradation and a fault of the handpiece caused by foreign substances accumulating inside the handpiece.

The invention claimed is:

1. A handpiece connector configured to connect a handpiece for dental treatment and a hose, and to allow air and washing water to flow therethrough, the handpiece connector comprising:

a first cartridge part including a plurality of flow path parts configured to face the handpiece and the hose, the plurality of flow path parts including:

a first flow path part configured to receive air from the hose and discharge the air to drive the handpiece, a second flow path part configured to exhaust the air that has been discharged from the first flow path part and used to drive the handpiece, a third flow path part configured to receive air from the hose and discharge the air to be used in an oral cavity, and a fourth flow path part configured to allow a washing water supplied from the hose to flow into the handpiece;

a second cartridge part including an internal space into which the first cartridge part penetrates; and a filter part disposed in the internal space to filter air passing through the first flow path part and the third flow path part, and wherein the filter part is configured to filter the air discharged from the first flow path part and the third flow path part disposed within the filter part in radial directions toward the internal space to allow the air to be sucked into the handpiece, wherein the filter part includes:

a filter;

an upper cap; and a lower cap, the upper cap and the lower cap supporting the filter, wherein the first flow path part and the third flow path part are positioned within the filter part, wherein the second flow path part and the fourth flow path part penetrate the upper cap to communicate with the handpiece.

2. The handpiece connector of claim 1, wherein the upper cap includes a second flow path hole and a fourth flow path hole through which only the second flow path part and the fourth flow path part penetrate.

3. The handpiece connector of claim 1, wherein the first flow path part and the third flow path part are configured to allow the air, which has been discharged from the first flow path part and the third flow path part and filtered, to be sucked into a first corresponding flow path pipe and a third corresponding flow path pipe of the handpiece through a distance, respectively.

4. The handpiece connector of claim 3, wherein the second flow path part and the fourth flow path part are configured to be in communication with a second corresponding flow path pipe and a washing pipe of the handpiece, respectively.

5. A handpiece connector configured to connect a handpiece for dental treatment and a hose, and to allow air and washing water to flow therethrough, the handpiece connector comprising:

a first cartridge part including a plurality of flow path parts configured to face the handpiece and the hose, the plurality of flow path parts including:

a first flow path part configured to receive air from the hose and discharge the air to drive the handpiece, a second flow path part configured to exhaust the air that has been discharged from the first flow path part and used to drive the handpiece, a third flow path part configured to receive air from the hose and discharge the air to be used in an oral cavity, and a fourth flow path part configured to allow a washing water supplied from the hose to flow into the handpiece;

a second cartridge part including an internal space into which the first cartridge part penetrates; and a filter part disposed in the internal space to filter air passing through the first flow path part and the third flow path part, and wherein the filter part is configured to filter the air discharged from the first flow path part and the third flow path part disposed within the filter part in radial directions toward the internal space to allow the air to be sucked into the handpiece, wherein the filter part includes:

a filter;

an upper cap; and a lower cap, the upper cap and the lower cap supporting the filter, wherein the first flow path part and the third flow path part are positioned within the filter part, wherein the upper cap includes a second flow path hole and a fourth flow path hole through which only the second flow path part and the fourth flow path part penetrate, respectively.

* * * * *